United States Patent
Cariccia et al.

(10) Patent No.: US 12,422,034 B2
(45) Date of Patent: Sep. 23, 2025

(54) FILTERING PULLEY

(71) Applicant: DAYCO EUROPE S.R.L., Ivrea (IT)

(72) Inventors: Gianluca Cariccia, Ivrea (IT); Andrea Guala, Ivrea (IT); Stefano Amadio, Ivrea (IT); Jacopo Spinelli, Ivrea (IT)

(73) Assignee: MUVIQ S.R.L., Ivrea (IT)

( * ) Notice: Subject to any disclaimer, the term of this patent is extended or adjusted under 35 U.S.C. 154(b) by 7 days.

(21) Appl. No.: 18/560,200

(22) PCT Filed: May 17, 2022

(86) PCT No.: PCT/IB2022/054561
§ 371 (c)(1),
(2) Date: Nov. 10, 2023

(87) PCT Pub. No.: WO2022/243855
PCT Pub. Date: Nov. 24, 2022

(65) Prior Publication Data
US 2024/0240705 A1    Jul. 18, 2024

(30) Foreign Application Priority Data
May 17, 2021  (IT) ........................ 102021000012614

(51) Int. Cl.
*F16H 55/36*  (2006.01)
(52) U.S. Cl.
CPC ....... *F16H 55/36* (2013.01); *F16H 2055/366* (2013.01)

(58) Field of Classification Search
CPC .......................... F16H 55/36; F16H 2055/366
See application file for complete search history.

(56) References Cited

U.S. PATENT DOCUMENTS

| | | | |
|---|---|---|---|
| 9,581,232 B2* | 2/2017 | Odenmarck | F16D 3/12 |
| 2015/0024885 A1* | 1/2015 | Odenmarck | F16D 3/84 |
| | | | 474/94 |

FOREIGN PATENT DOCUMENTS

| | | | |
|---|---|---|---|
| DE | 102017113043 A1 | 12/2018 | |
| EP | 2827014 A1 * | 1/2015 | ............... F16D 3/12 |

OTHER PUBLICATIONS

International Search Report and Written Opinion, Application No. PCT/IB2022/054561, Jun. 28, 2022, p. 12.

* cited by examiner

*Primary Examiner* — Anna M Momper
*Assistant Examiner* — Juan J Campos, Jr.
(74) *Attorney, Agent, or Firm* — FisherBroyles, LLP; Susan M. Oiler

(57) ABSTRACT

Filtering pullies with a hub adapted to be fixed to a rotating shaft, a crown mounted coaxially and rotationally free on the hub, at least one elastic group arranged circumferentially with respect to the hub and the crown and interposed, each, between a pair of first elements integral with the hub and between a pair of second elements integral with the crown are disclosed. The pulley has a dust protection lip carried integrally by said hub and configured to slide, in tight manner, with respect to an element integral with said crown. The dust protection lip is a labyrinthine sealing lip.

13 Claims, 3 Drawing Sheets

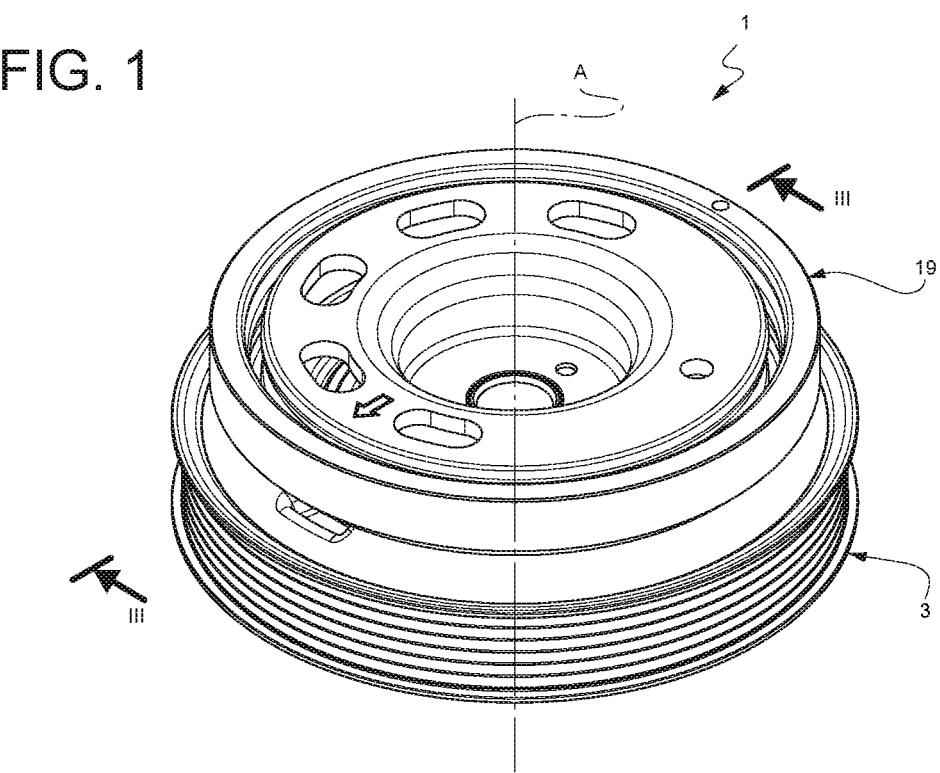
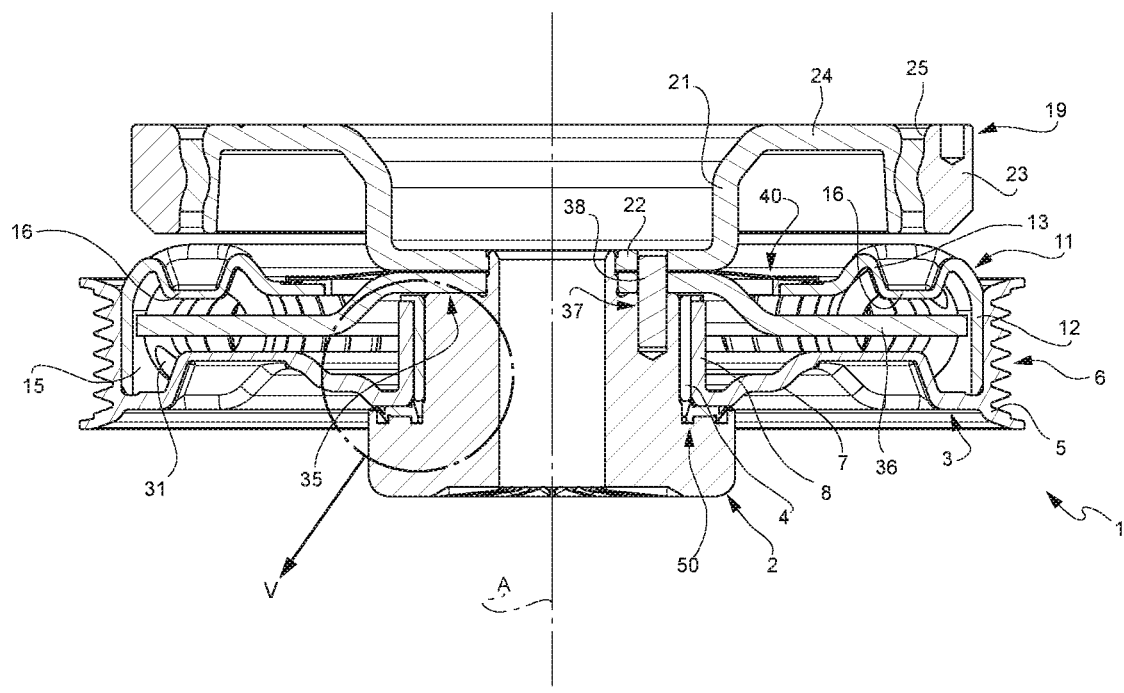

FILTERING PULLEY

CROSS-REFERENCE TO RELATED APPLICATIONS

The present invention is filed under 35 U.S.C. § 371 as the U.S. National Phase of International Patent Application No. PCT/IB2022/054561, filed May 17, 2022, which designated the United States and which claims the benefit of Italian Patent Application No. 102021000012614, filed on May 17, 2021, the entire disclosure of which is incorporated herein by reference.

TECHNICAL FIELD OF THE INVENTION

The present invention relates to a filtering pulley, preferably a pulley for a crankshaft in an accessory drive of an internal combustion engine.

STATE OF THE ART

As is known, the drive shaft in internal combustion engines is subjected to torsional vibrations due to the periodic stress caused by the combustion in the cylinders. Such vibrations are particularly intense at the start and at low speeds, as well as in the presence of particular constructional solutions such as, for example, the use of double clutch gearboxes or start-stop systems.

The torsional vibrations result in rotational irregularities of the drive pulley of the accessory drive which are transmitted to the accessories by means of the drive belt, which is thus subjected to periodic tension variations.

With the object "to filter" the torsional oscillations transmitted from the crankshaft to the belt, a filtering pulley is generally used as drive pulley, said filtering pulley being provided with a hub integral with the drive shaft, a crown cooperating with the belt and one or more elastic elements through which the torque is transmitted from the hub to the crown. An example of such filtering pulley is illustrated in WO2016/151455 A1.

One of the critical elements of the filtering pulley of the type described above is the relative rotation of the crown on the hub. In particular, the overrunning moments between crown and hub must be contained; furthermore, the need is felt to prevent the insertion of dust and debris between hub and crown causing noises and reducing the useful life of the filtering pulley.

The object of the present invention is to manufacture a filtering pulley which solves the aforementioned technical problem in a simple and cost-effective manner.

SUBJECT AND SUMMARY OF THE INVENTION

The aforementioned object is achieved by a filtering pulley according to what claimed in the appended claims.

BRIEF DESCRIPTION OF THE DRAWINGS

In order to better understand the present invention, a preferred embodiment is described in the following, by way of non-limiting example and with reference to the accompanying drawings, wherein:

FIG. 1 is a perspective view of a filtering pulley according to the invention;

FIG. 3 is a sectional view according to line III-III of the pulley of FIG. 1;

DETAILED DESCRIPTION OF PREFERRED EMBODIMENTS OF THE INVENTION

Figure 2:
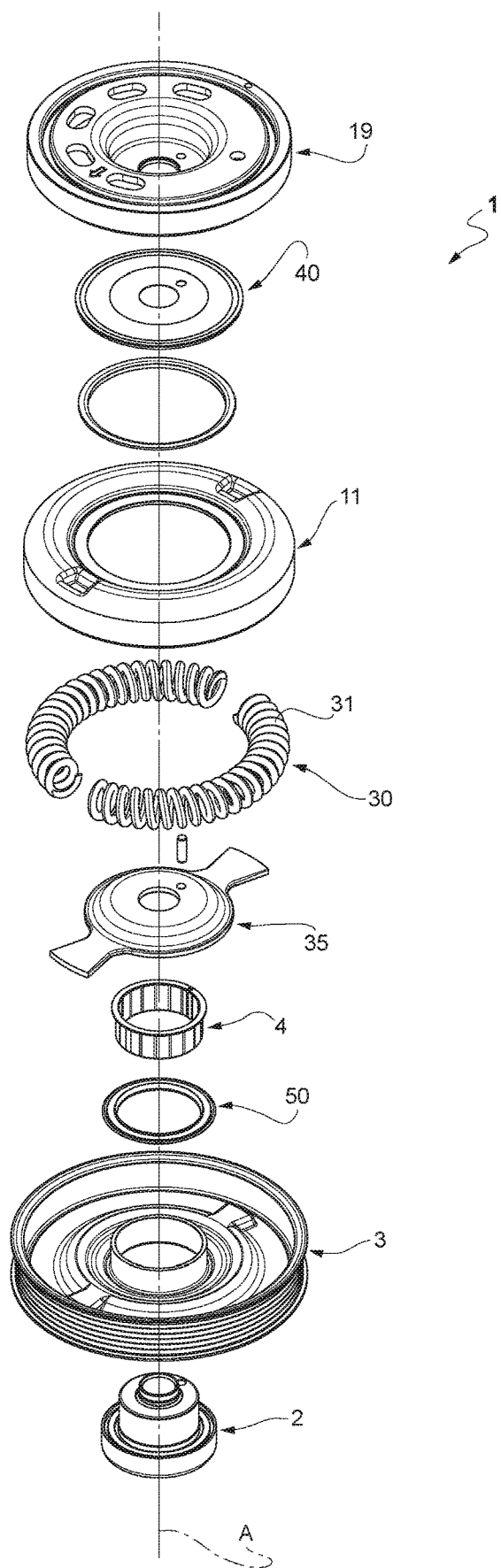
FIG. 2 is an exploded view of the pulley of FIG. 1.
Figure 4:
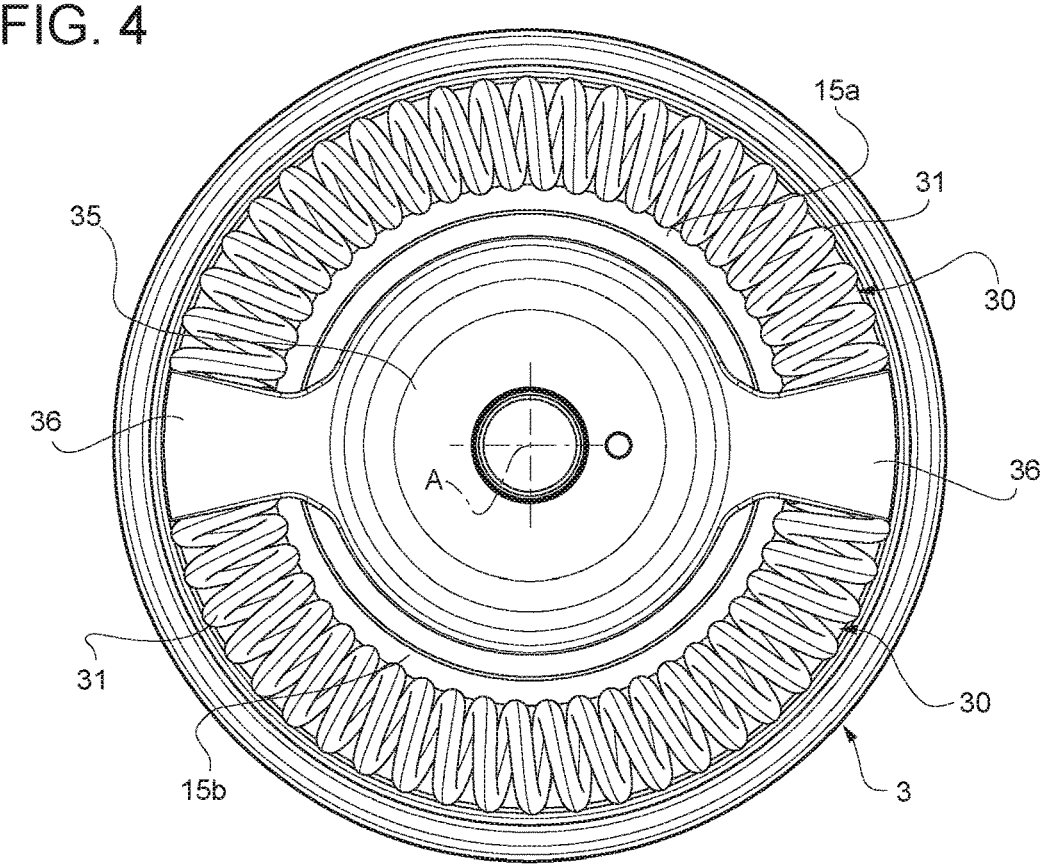
FIG. 4 is a top view of the pulley of FIG. 1 with parts removed for clarity.
Figure 5:
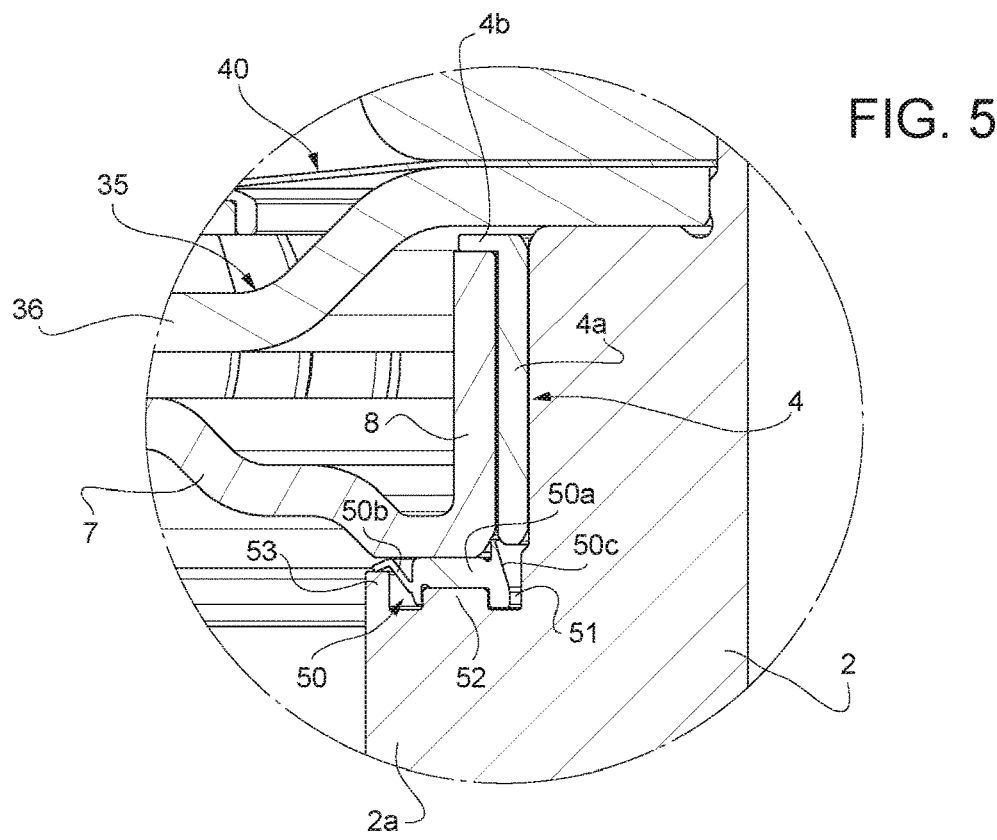
FIG. 5 is an enlarged view of a portion of FIG. 3.

In the accompanying figures, a filtering pulley 1 is represented comprising a hub 2 of axis A, adapted to be connected to a shaft (not represented), for example a crankshaft of an internal combustion engine, and an annular crown 3 externally coaxial to the hub 2 and supported in a rotationally free manner on the hub 2 by means of a supporting element 4.

The crown 3 comprises an annular portion 5 provided with a profile 6 adapted to cooperate with a poly-V belt (not represented). The crown 3 further comprises a radial wall 7, integral with the annular portion 5 and preferably of a single piece therewith, extending radially towards the hub 2, and a substantially cylindrical internal wall 8 of axis A.

The crown 3 carries, integral thereto, a closing element 11 comprising an outer cylindrical wall 12 of axis A, a flat radial annular wall 13. The closing element 11 is driven into the crown 3 so as to form an annular chamber 15 radially comprised between the wall 12 and the wall 8 and axially delimited by the wall 7 and the wall 13.

The closing element 11 finally comprises two diametrically opposite projections 16 axially extending inside the chamber 15 starting from the wall 13 (see FIG. 3). The projections 16 divide the chamber 15 into two portions 15a, 15b, preferably of equal dimensions.

On the wall 7 stop elements can be provided, such as further two projections (not illustrated) preferably arranged at 180° with respect to the projections 16, thus substantially in the middle of the respective aforementioned portions 15a, 15b of the chamber 15. The projections 16 or the aforementioned stop elements are carried fixed by the respective walls or, alternatively, made of a single piece with the same.

The pulley 1 can further be provided with a dynamic damper 19 comprising a disc 21, facing the closing element 11 and having a portion of hub 22 integral with the hub 2, and a seismic ring 23 constrained to a peripheral flange 24 of the disc 21 by a ring 25 of elastomeric material.

As is illustrated, the pulley 1 further comprises at least one elastic group 30, for example two elastic groups 30 arched and arranged circumferentially free in the respective portions 15a, 15b of the chamber 15 delimited by the projections 16.

Each of the elastic groups 30 comprises at least one spring, in the described case a helical and arched spring 31 mounted between the aforementioned projections 16.

The pulley 1 further comprises an actuator 35 carried integrally by the hub 2 and advantageously axially interposed between the hub 2 and the disc 21 of the dynamic damper 19. The actuator 35 has two spokes 36 free to move circumferentially in the chamber 15 and adapted to interact with the elastic groups 30 by contact as described in the following.

Advantageously, the actuator 35 is carried by the hub 2 by means of a shape coupling 37, for example by means of a pin 38 configured to be inserted in respective openings of the actuator 35 and of the hub 2. Preferably, the shape coupling 37 allows the coupling also of the disc 21 of the dynamic damper 19 to the hub 2, hence it comprises an opening adapted for the insertion of the pin 38.

The actuator 35 can be placed in contact with the elastic groups 30, possibly with a circumferential interference value so as to preload the elastic groups 30 inside the seat 15. Alternatively, it can be placed with an angular interval with respect to the elastic groups 30, i.e. an angular play before entering into contact with the same.

The pulley 1 can further comprise a dust protection system 40 configured to isolate the space 15 from the outside and extending between the wall 13 of the element 11 and the hub 2.

According to the invention, the pulley 1 further comprises a dust protection lip 50 configured to prevent the contamination from the outside of the rotating support 4 between hub 2 and crown 3. Furthermore, the dust protection lip 50 has the function of axial thrust bearing.

According to a further aspect of the invention, the rotating support 4 is a bush having an L-shaped section and provided with an annular cylindrical portion 4a and a radial wall 4b made of a single piece.

The cylindrical portion 4a is radially interposed in contact between the hub 2 and the wall 8 and the hub 2 is configured to support a radial load between crown 3 and hub 2, whereas the radial wall 4b is placed axially in contact with the wall 8 and facing the actuator 35, i.e. on the opposite side of the dust protection lip 50, without contact with the same. The radial wall 4b is thus intended to contain possible axial loads acting on the crown 3; in particular, it defines the light with respect to the actuator 35 and thus the maximum axial stroke of the same.

The dust protection lip 50 is axially interposed between a projection 2a of the hub 2 and the wall 7 connecting the walls 8 and 5, advantageously in a radially external position with respect to the bush 4. More specifically, the dust protection lip 50 is placed in contact between the wall 7 and the projection 2a.

In particular, the projection 2a defines an annular seat 51 adapted to house the dust protection lip 50. The seat 51 is radially comprised between an axial projection 53 extending cantilevered from the projection 2a of the hub 2 and the outer surface of the remaining part of the hub 2, axially it is open towards the wall 7, whereas it is closed by a bottom wall of the projection 2a.

In particular, the bottom wall of the seat 51 has a variable height section, in particular an axial annular protrusion 52 configured to cooperate in contact with the dust protection lip 50 as described in the following.

The dust protection lip 50 comprises a central portion adapted to cooperate in contact with the bottom wall of the seat 51 and with the wall 7. Consequently to what described above, the central portion 50a is configured to be inserted around the axial annular protrusion 52 so as to be axially fixed with respect to the hub 2.

The dust protection lip 50 also comprises a lower radial lip 50c and an upper radial lip 50b respectively shaped for extending axially beyond the central portion 50a and radially above with respect to the same.

In particular, the lower radial lip 50c is configured to cooperate in contact with the wall 7, whereas the upper radial lip 50b is configured to cooperate in contact with the axial projection 53.

According to what described above, thanks to its geometry, the dust protection lip 50 is of labyrinthine type, i.e. defines a tortuous path between the external environment and the bush 4 effectively preventing the insertion of dust or debris towards it.

Advantageously, the dust protection lip 50 is made of polymeric material and of a single piece.

The operation of the pulley 1 is described in the following.

In a first operational step, called driving mode and constituting the normal operation of the pulley 1, when the drive shaft pulls the accessories, the speed of the hub 2 tends to exceed the speed of the crown 3. For this reason, the spokes 36 of the actuator 35 transmit the torque to the projections 16 with the interposition of the respective elastic groups 30.

What described above occurs, symmetrically, in the overrunning condition, i.e. when the speed of the crown 3 tends to exceed the speed of the hub 2.

Depending on the damping present between the hub 2 and the crown 3, as known per se, a hysteresis can be present with respect to the two operations described above. In case of important angular variations which could damage the elastic groups 30, the stop elements prevent excessive relative rotation between hub 2 and crown 3.

The actuator 35 if in contact preloaded by or distanced from the elastic groups, allows an angular play between hub 2 and crown 3.

During the movement between hub 2 and crown 3, the dust protection lip 50 is pulled in its rotation around the axis A and slides with respect to the wall 7. During such sliding, it has the function of preventing the dirt from reaching the bush 4 which is preserved from contaminations.

Furthermore, the bush 4, during the relative rotational movement between hub 2 and crown 3 absorbs possible axial loads thanks to the L shape provided by the same.

The advantages of a pulley 1 according to the invention are thus evident.

Thanks to the dust protection lip 50 dirt elements are prevented from reaching the bush 4, protecting the operation thereof, reducing the noises and increasing the life expectancy thereof.

The particular arrangement and shape of the dust protection lip 50 ensures an excellent sealing thanks to the anchoring on the axial annular protrusion 52 and to the labyrinthine path defined by the lips 50b, 50c.

Still, the presence of the bush 4 having an L-shaped section allows resisting against possible overrunning loads acting on the crown 3 with respect to the hub 2.

Additionally, the bush 4 allows an easy mounting of the pulley 1.

Furthermore, synergically, the configuration of the L-shaped bush 4 and the arrangement with respect thereto of the dust protection lip 50 further prevent dust or debris from being channeled between crown 3 and hub 2, protecting the relative movement thereof and thus the useful life of the pulley 1.

Finally, it is clear that modifications or variations can be made to the described pulley which do not depart from the scope of protection defined by the claims.

First of all, the pulley could be used not exclusively on the crankshaft of an internal combustion engine but for one of the accessories of the same.

With reference to the elastic group 30, they could be manufactured without anyway modifying their function. For example, they could comprise springs of different nature or several springs, in series or in parallel. Still, the elastic groups could be four and likewise the spokes of the actuator.

The dynamic damper 19 could be absent and the actuator could be carried differently by the hub 2.

Still, the shape of the lips of the dust protection lip 50 or the arrangement of the bush 4 could vary.

The invention claimed is:

1. A filtering pulley comprising:
a hub adapted to be fixed to a shaft rotating around an axis (A),
a crown mounted coaxially and rotationally free on said hub,
at least one elastic group arranged circumferentially with respect to said hub and said crown and interposed, each, between a pair of first elements integral with said hub and between a pair of second elements integral with said crown,
a dust protection lip operatively seated in an annular groove in an annular flange of said hub and configured to slide, in tight manner, with respect to said crown, wherein said dust protection lip has a labyrinthine sealing lip, and is axially facing and cooperating in contact with an exterior radial wall of said crown.

2. The pulley according to claim 1, wherein the annular seat defines a seat that is axially defined, on one side, by a variable height surface, and said dust protection lip comprises a main body configured to cooperate in contact with said variable height surface to radially fix said dust protection lip to said hub.

3. The pulley according to claim 2, wherein said variable height surface is defined by an axial annular protrusion in the annular groove.

4. The pulley according to claim 2, wherein the radially outer boundary of said seat is defined by an axial projection extending from the annular flange of said hub, and said dust protection lip has a first lip in contact with said axial projection and extending radially externally from said main body of the dust protection lip.

5. The pulley according to claim 2, wherein said dust protection lip comprises a second lip configured to extend from said main body and configured to cooperate in contact with the exterior radial wall of said crown, said second lip extending in the axial direction more than said main body.

6. The pulley according to claim 1, wherein said dust protection lip is made of polymeric material and of a single piece.

7. The pulley according to claim 1, wherein said crown is carried rotationally free on said hub by means of a bush radially interposed between said element and said hub, said bush having an L-shaped section.

8. The pulley according to claim 7, wherein said bush comprises a cylindrical wall radially interposed between said element and said hub and a radial portion extending radially externally from said cylindrical wall on the opposite side of said dust protection lip.

9. The pulley according to claim 1, wherein said first elements comprise at least two spokes carried by an actuator integral with the hub, said dust protection system being carried by said hub.

10. The pulley according to claim 9, wherein said actuator is carried by said hub by means of a shape coupling.

11. The pulley according to claim 1, wherein said second elements are projections integral with an element of said crown.

12. The pulley according to claim 11, wherein said at least one elastic group is circumferentially sliding inside a seat formed between said first elements and/or said second elements.

13. The pulley according to claim 1, further comprising a dynamic damper operatively connected to the hub.

* * * * *